(12) United States Patent
Shin

(10) Patent No.: US 10,305,892 B2
(45) Date of Patent: May 28, 2019

(54) DEVICE SYSTEM FOR PERFORMING GROUP AUTHENTICATION AND OPERATING METHOD THEREOF

(71) Applicant: SAMSUNG ELECTRONICS CO., LTD., Suwon-si, Gyeonggi-Do (KR)

(72) Inventor: Jong-Hoon Shin, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 182 days.

(21) Appl. No.: 15/297,980

(22) Filed: Oct. 19, 2016

(65) Prior Publication Data
US 2017/0208059 A1 Jul. 20, 2017

(30) Foreign Application Priority Data

Jan. 18, 2016 (KR) .................. 10-2016-0005975

(51) Int. Cl.
*H04L 29/06* (2006.01)
*H04L 9/32* (2006.01)

(52) U.S. Cl.
CPC ........ *H04L 63/0853* (2013.01); *H04L 9/3271* (2013.01); *H04L 63/104* (2013.01)

(58) Field of Classification Search
CPC ....... G06F 21/57; G06F 21/73; H04L 63/0853
See application file for complete search history.

(56) References Cited

U.S. PATENT DOCUMENTS

| | | | |
|---|---|---|---|
| 8,494,379 B2 | 7/2013 | Kim | |
| 8,526,833 B2 | 9/2013 | Kojo | |
| 8,954,757 B2 | 2/2015 | Kang | |
| 2006/0140647 A1* | 6/2006 | Adkins | ............. G03G 21/1892 399/12 |
| 2011/0170146 A1* | 7/2011 | Simpson | ............. B41J 2/17546 358/3.28 |
| 2014/0211241 A1 | 7/2014 | Rice et al. | |

FOREIGN PATENT DOCUMENTS

| | | |
|---|---|---|
| JP | 2005292771 | 10/2005 |
| JP | 2012013928 A | 1/2012 |
| JP | 2012088460 A | 5/2012 |
| JP | 2015085510 A | 5/2015 |
| JP | 2015104893 A | 6/2015 |
| KR | 101518555 | 4/2016 |

* cited by examiner

*Primary Examiner* — Dao Q Ho
(74) *Attorney, Agent, or Firm* — Volentine, Whitt & Francos, PLLC

(57) ABSTRACT

A device system that performs group authentication and an operating method thereof are provided. The device system includes multiple devices. The operating method of the device system includes performing a first authentication procedure with respect to a first device that is newly connected to the device system; and performing a second authentication procedure with respect to the first device via an authentication group including at least two devices selected from the devices. The second authentication procedure is a group-based authentication procedure. If the first and second authentication procedures are successful, the operating method includes approving connection of the first device to the device system.

19 Claims, 18 Drawing Sheets

DEVICE SYSTEM FOR PERFORMING GROUP AUTHENTICATION AND OPERATING METHOD THEREOF

CROSS-REFERENCE TO RELATED APPLICATION

This application claims the benefit of priority under 35 U.S.C. § 119 to Korean Patent Application No. 10-2016-0005975, filed on Jan. 18, 2016, in the Korean Intellectual Property Office, the disclosure of which is incorporated herein in its entirety by reference.

BACKGROUND

Field of the Disclosure

The present disclosure relates to a device that includes an authentication module. More particularly, the present disclosure relates to a device system for performing group authentication and an operating method thereof.

Background Information

As a method of enhancing the security of devices physically or electrically connected to each other, authentication procedures between the devices may be performed. For example, in the case of an image forming apparatus such as a printer system, an authentication procedure is performed between a main printer and a cartridge to determine whether the cartridge is genuine. Upon sensing a connection of a new cartridge to the main printer, a one-to-one authentication procedure is performed between an authentication module included in the main printer and an authentication module included in the newly connected cartridge. When the authentication procedure is successful, the new cartridge may be effectively used in the printer system.

However, when a security function of the authentication module included in the main printer fails to work normally due to factors such as hacking, unauthorized cartridges may be indiscriminately used. Accordingly, printer manufacturers may incur considerable damages. Further, as the unauthorized cartridges are used, problems such as malfunction of the main printer may occur.

SUMMARY

The present disclosure describes an operating method of a device system with increased security for preventing connection of an unauthorized device to the device system.

According to an aspect of the present disclosure, a device system includes multiple devices. An operating method of the device system includes performing a first authentication procedure with respect to a first device that is newly connected to the device system. The operating method also includes performing a second authentication procedure with respect to the first device via an authentication group that includes at least two devices selected from the multiple devices. The second authentication procedure is a group-based authentication procedure. If the first and second authentication procedures are successful, the operating method includes approving connection of the first device to the device system.

According to another aspect of the present disclosure, an operating method of a device includes, upon sensing a connection of the device to a main device, requesting an authentication procedure with respect to the main device. The operating method also includes receiving a request for an authentication procedure with an authentication group that includes one or more sub devices previously connected to the main device. In response to the receiving of the request for the authentication procedure, the operating method includes performing the authentication procedure with the authentication group.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Figure 1:
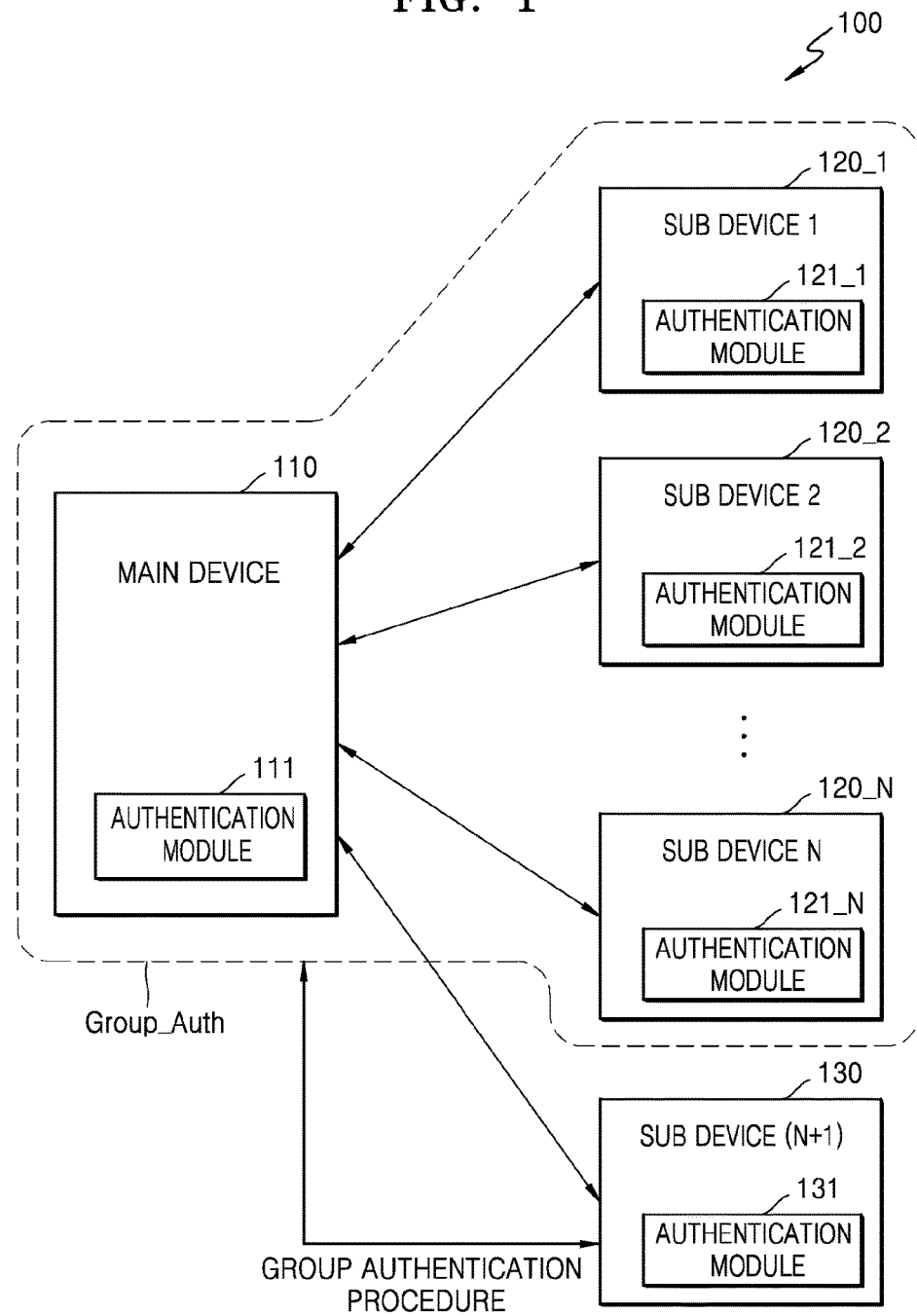
FIG. 1 is a block diagram of a device system that includes devices, according to an embodiment

FIG. 1 is a block diagram of a device system 100 that includes devices, according to an embodiment.

Referring to FIG. 1, the device system 100 may include multiple devices. For example, the device system 100 may include a main device 110 and first to N-th sub devices 120_1 to 120_N. Each of the first to N-th sub devices 120_1 to 120_N may be mounted and physically connected to the main device 110 or may be connected to the main device 110 via a wired or wireless communication network. In addition, it is assumed that the main device 110 and the first to N-th sub devices 120_1 to 120_N have been normally authenticated as genuine through authentication procedures.

For example, when the main device 110 is an image forming apparatus such as a main printer, each of the first to N-th sub devices 120_1 to 120_N may be a device such as a cartridge capable of being combined with the main printer. In addition, each of the devices illustrated in FIG. 1 may be various types of electronic apparatuses capable of performing an authentication procedure. For example, each of the devices may be various electronic apparatuses such as a mobile device, a smartphone, a personal digital assistant (PDA), a personal computer (PC), a tablet PC, a laptop, a netbook, or a home appliance.

Although it is assumed with respect to FIG. 1 that the main device 110 is a main printer and each of the first to N-th sub devices 120_1 to 120_N is a cartridge, according to one or more embodiments, each of the devices may be variously termed. For example, the main device 110 may serve both as a host and a slave for each of the first to N-th sub devices 120_1 to 120_N. Each of the first to N-th sub devices 120_1 to 120_N may also serve both as a host and a slave for the main device 110. That is, the main printer and the cartridge may be referred to as similar devices without being respectively referred to as a main device and a sub device.

The main device 110 and each of the first to N-th sub devices 120_1 to 120_N may authenticate an opposing device through a predetermined authentication procedure with respect to each other. For example, the main device 110 and each of the first to N-th sub devices 120_1 to 120_N may perform a one-to-one challenge-response based authentication procedure. As an example of an algorithm used in the authentication procedure, a symmetric key algorithm such as an algorithm compliant with the Advanced Encryption Standard (AES) or Data Encryption Standard (DES), or on an asymmetric key algorithm such as a Rivest Shamir Adleman (RSA) algorithm or a Elliptic Curve Cryptography (ECC) algorithm may be used.

For the above-described authentication procedure, the main device 110 may include an authentication module 111. The first to N-th sub devices 120_1 to 120_N may also include authentication modules 121_1 to 121_N. Various types of information such as parameters used in the authentication procedure may be installed in each of the authentication modules 111 and 121_1 to 121_N, or each of the authentication modules 111 and 121_1 to 121_N may include an information generating module (not shown) for generating the various types of parameters. The main device 110 and the first to N-th sub devices 120_1 to 120_N may perform the authentication procedure by using a one-way authentication protocol or a mutual authentication protocol through the authentication modules 111 and 121_1 to 121_N.

A new device (for example, a $(N+1)^{th}$ sub device 130) may be newly connected to the device system 100. For example, the $(N+1)^{th}$ sub device 130 may be newly connected to the main device 110. According to an embodiment, upon sensing a connection of the new device to the main device 110, a group authentication procedure (or one-to-group authentication procedure) may be performed with respect to the newly connected device.

As an operation example, a mutual authentication procedure may be performed between the main device 110 and the $(N+1)^{th}$ sub device 130. Accordingly, the main device 110 may request the $(N+1)^{th}$ sub device 130 for an authentication procedure. The $(N+1)^{th}$ sub device 130 may also request the main device 110 for the authentication procedure. Thus, a one-to-one challenge-response based authentication procedure may be performed first between the main device 110 and the $(N+1)^{th}$ sub device 130. When the authentication procedure between the main device 110 and the $(N+1)^{th}$ sub device 130 fails, the $(N+1)^{th}$ sub device 130 is not allowed to connect to the device system 100.

When the authentication procedure succeeds, according to an embodiment, the group authentication procedure may be performed with respect to the $(N+1)^{th}$ sub device 130. For example, two or more devices from among devices previously connected to the device system 100 may be set as belonging to one authentication group Group_Auth. The $(N+1)^{th}$ sub device 130 may be requested to comply with or otherwise participate in the group authentication procedure with respect to the authentication group Group_Auth. Thus, the authentication procedure may be performed between the authentication group Group_Auth and the $(N+1)^{th}$ sub device 130.

According to an embodiment, the group authentication procedure may be performed by a mutual authentication procedure between each of the devices included in the authentication group Group_Auth and the $(N+1)^{th}$ sub device 130. For example, the $(N+1)^{th}$ sub device 130 may perform a one-to-one challenge-response based authentication procedure with each of the devices included in the authentication group Group_Auth.

Alternatively, in order to perform the group authentication procedure, a group operation may be performed between the devices included in the authentication group Group_Auth. The group authentication procedure regarding the $(N+1)^{th}$ sub device 130 may be performed using information that is generated during the group operation process. As an example, the group authentication procedure may be performed according to various algorithms. For example, the authentication procedure may be performed between the authentication group Group_Auth and the $(N+1)^{th}$ sub device 130 by using an algorithm such as an ECC paring method.

In an embodiment, any one of the devices included in the authentication group Group_Auth may be selected as an authentication entity. A challenge-response based authentication procedure may be performed between the $(N+1)^{th}$ sub device 130 and the authentication entity. In the ECC pairing method, for example, during an algorithm process for the authentication procedure, unique information (for example, ID information) corresponding to the authentication group Group_Auth, unique information (for example, a parameter value) related to public key generation, etc. may be generated. According to an embodiment, during the group authentication procedure, unique information corresponding to the authentication group Group_Auth may be generated by combining pieces of information from the devices included in the authentication group Group_Auth. The authentication procedure with the $(N+1)^{th}$ sub device 130 may be performed based on the unique information.

The selection of the authentication entity may be independently performed by the main device 110, or even by an external networked controller that can communicate with the main device 110. Alternatively, the selection of the authentication entity can be coordinated by the main device 110 and the first to N-th sub devices 120_1 to 120_N, based on, for example, operability or availability of the first to N-th sub devices 120 1 to 120 N.

When the above-described group authentication procedure succeeds, a normal connection between the main device 110 and the $(N+1)^{th}$ sub device 130 is allowed. For example, a session between the main device 110 and the $(N+1)^{th}$ sub device 130 may be set. Communication may be performed using an encryption key generated in the above-described authentication procedure with the main device 110 or in the group authentication procedure.

According to the above-described group authentication procedure, even though the main device 110 is hacked, and internal important information thereof is revealed, authentication with respect to the $(N+1)^{th}$ sub device 130 may be performed based on the authentication group Group_Auth that includes one or more other devices that maintain security. Accordingly, although a security function of the main device 110 fails to normally work due to factors such as hacking, the main device 110 may be prevented from mistakenly approving connection of an unauthorized device.

In the embodiment illustrated in FIG. 1, the first to N-th sub devices 120_1 to 120_N previously connected to the device system 100 may also be devices that have been authenticated through the above-described group authentication procedure. For example, when the N-th sub device 120_N is newly connected to the main device 110, the authentication group Group_Auth may be set to include existing sub devices (for example, the first to $(N-1)^{th}$ sub devices 120_1 to 120_(N-1)). The group authentication procedure according to the above-described embodiment may be performed with respect to the N-th sub device 120_N.

Although the embodiment of FIG. 1 illustrates that all of the devices previously connected to the device system 100 are set as the authentication group Group_Auth, the present disclosure is not limited thereto. For example, only some devices from among the devices previously connected to the device system 100 may be set as the authentication group Group_Auth, or any devices from among the devices previously connected to the device system 100 may be set as the authentication group Group_Auth. Alternatively, the devices previously connected to the device system 100 may be set as at least two authentication groups Group_Auth. Each of the authentication groups Group_Auth may perform the group authentication procedure with respect to the newly connected $(N+1)^{th}$ sub device 130.

According to the above-described embodiment, a problem when authentication succeeds indiscriminately with regard to unauthorized devices as the security function of the main device 110 fails to normally work may be prevented. Also, without addition of another means of preventing authentication with respect to an unauthorized device, the authentication with respect to the unauthorized device may be prevented by using only the devices previously connected to the device system 100. Accordingly, an increase in the cost of a security system may be reduced.

Figure 2:
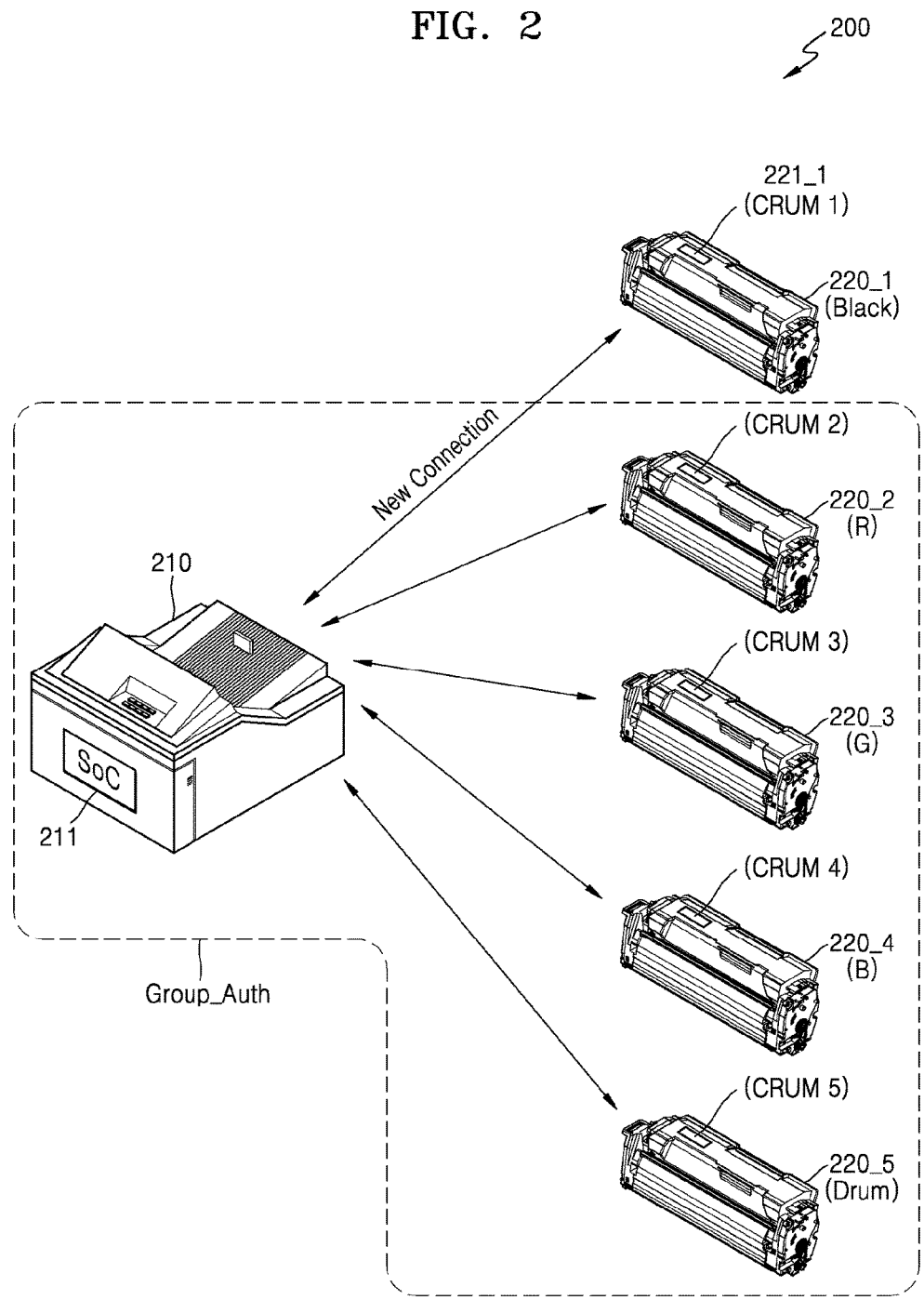
FIG. 2 is a block diagram showing an example of applying the device system of FIG. 1 to an image forming system, according to an embodiment.

FIG. 2 is a block diagram showing an example of applying the device system 100 to an image forming system 200, according to an embodiment.

Referring to FIG. 2, the image forming system 200 may include a main printer 210 as an image forming apparatus and may also include cartridges 220_1 to 220_5 as devices capable of being connected to the main printer 210. In the description below, the main printer 210 will be referred to as a printer.

As an example, the printer 210 may have an image with various colors formed through cartridges according to color types. For example, the cartridges 220_1 to 220_5 may include a black cartridge and R, G, B cartridges. Also, the cartridges 220_1 to 220_5 may include various types of cartridges according to structures thereof. For example, the cartridges 220_1 to 220_5 may include a drum cartridge having a drum and a toner integrally formed with each other. Although, in the description below, it is assumed that the first to fifth cartridges 220_1 to 220_5 are included in the image forming system 200, a different number of cartridges may be included in the image forming system 200. Also, at least some of the second to fifth cartridges 220_2 to 220_5 may be cartridges authenticated through an authentication procedure according to one or more embodiments (for example, group authentication procedure). It is assumed hereinafter that the first cartridge 220_1 is newly connected to the image forming system 200.

The printer 210 and each of the cartridges 220_1 to 220_5 may include an authentication module for performing authentication. For example, the printer 210 may include a system-on-chip 211 as a semiconductor chip including an authentication module inside.

Each of the cartridges 220_1 to 220_5 may include a customer replaceable unit monitor or customer replaceable unit memory (CRUM) including a security integrated circuit (IC). The security IC applied to the CRUM requires a high level of security and thus makes it hard to hack into the security IC applied to a cartridge, thereby preventing use of an unauthorized cartridge.

The security IC safely stores important information related to the authentication procedure. According to an embodiment, during a process of manufacturing the security IC, unique information that is used in the authentication procedure may be installed in the security IC through a hardware security module (HSM). According to an embodiment, unique information that is used in the group authentication procedure may be installed in the security IC. Also, the security IC may include a hardware means of defending against side channel attack.

On the other hand, the printer 210 may have an authentication module configured to perform the authentication procedure through a means having a relatively low level of security in order to reduce manufacturing cost per unit of the printer 210. For example, the printer 210 may not provide the high level of security supported by the above-described security IC. Accordingly, various types of information that are used in authentication may be exposed to the outside due to hacking into the system-on-chip 211 of the printer 210. In the case where the printer 210 is hacked, when an unauthorized cartridge is connected to the printer 210 thereafter, an authentication procedure regarding the unauthorized cartridge may be mistakenly determined as a success.

At least some of the devices previously connected to the image forming system 200 may be set as one authentication group Group_Auth. For example, the printer 210 and the second to fifth cartridges 220_2 to 220_5 may be set as the authentication group Group_Auth. Upon sensing that the first cartridge 220_1 is newly connected to the image forming system 200, the authentication procedure may be performed between the authentication group Group_Auth and the first cartridge 220_1.

According to an embodiment, an authentication procedure such as a one-to-one challenge-response method may be performed first between the printer 210 and the first cartridge 220_1. Alternatively, as a modifiable embodiment, the authentication procedure between the printer 210 and the first cartridge 220_1 may be omitted. An authentication procedure may be performed between the above-described authentication group Group_Auth and the first cartridge 220_1.

In the authentication procedure between the printer 210 and the first cartridge 220_1, the system-on-chip 211 of the printer 210 and the security IC included in a CRUM 221_1 of the first cartridge 220_1 may each perform an authentication procedure. As the printer 210 authenticates the first cartridge 220_1 as a normal device, the first cartridge 220_1 may authenticate the printer 210 as a normal device. When a mutual authentication procedure between the printer 210 and the first cartridge 220_1 succeeds, the group authentication procedure may be performed regarding the first cartridge 220_1.

In the group authentication procedure, the group authentication procedure may be performed regarding the first cartridge 220_1, according to a method of performing an authentication procedure regarding each of the devices included in the authentication group Group_Auth.

Alternatively, any one of the devices included in the authentication group Group_Auth may be selected as an authentication entity. An authentication procedure may be performed between the first cartridge 220_1 and the authentication entity. The authentication entity may generate, based on a combination of pieces of information of at least two devices included in the authentication group Group_Auth, unique information corresponding to the authentication group Group_Auth and may perform, based on the generated unique information, the authentication procedure with the first cartridge 220_1. For example, a challenge-response (for example, one-to-group challenge-response) based authentication procedure may be performed between the authentication entity and the first cartridge 220_1.

According to the above-described example, when a one-to-one challenge-response based authentication procedure between the first cartridge 220_1 and the printer 210 succeeds, and a one-to-group challenge-response based authentication procedure between the first cartridge 220_1 and the authentication group Group_Auth also succeeds, the first cartridge 220_1 may be normally connected to the printer 210 and may operate. However, when any one of the authentication procedures fails, the first cartridge 220_1 is determined as an unauthorized cartridge and is not normally connected to the printer 210.

Figure 3:
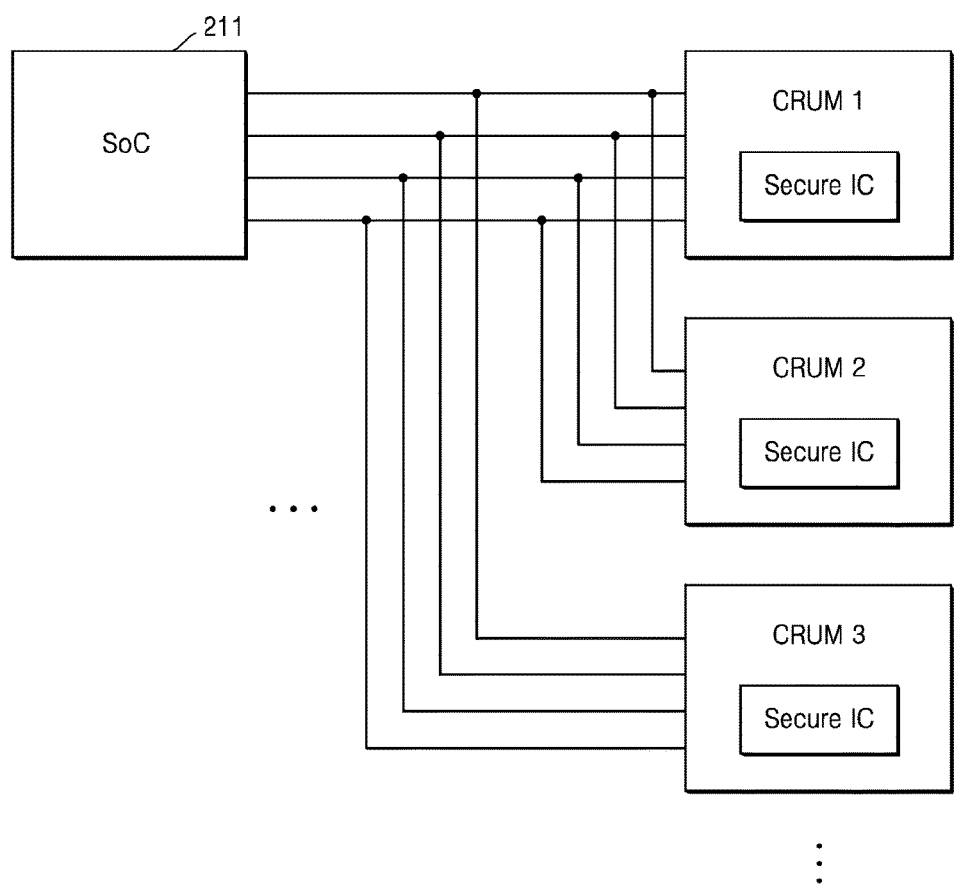
FIG. 3 is a block diagram illustrating a connection relationship between a system-on-chip and customer replaceable unit monitors or customer replaceable unit memories (CRUMs) in the image forming system of FIG. 2.

FIG. 3 is a block diagram of connection relationship between the system-on-chip 211 and customer replaceable unit monitors or customer replaceable unit memories (CRUMs) in the image forming system 200 of FIG. 2.

Referring to FIGS. 2 and 3, when the first cartridge 220_1 is newly connected to the image forming system 200, CRUM 1 of the first cartridge 220_1 is connected to the system-on-chip 211 of the printer 210 via one or more wirings. Also, CRUM 1 may be electrically connected to the CRUMs of previously connected cartridges, which are included in the image forming system 200, via the one or more wirings. For example, CRUM 1 of the first cartridge 220_1 may be electrically connected to CRUM 2 to CRUM 5 of second to fifth cartridges 220_2 to 220_5.

According to the connection relationship as described above, in the image forming system 200, multiple devices may be set as the authentication groups Group_Auth. Any one of the devices in the authentication groups Group_Auth may be selected as an authentication entity to perform an authentication procedure with the newly connected first cartridge 220_1.

Figure 4:
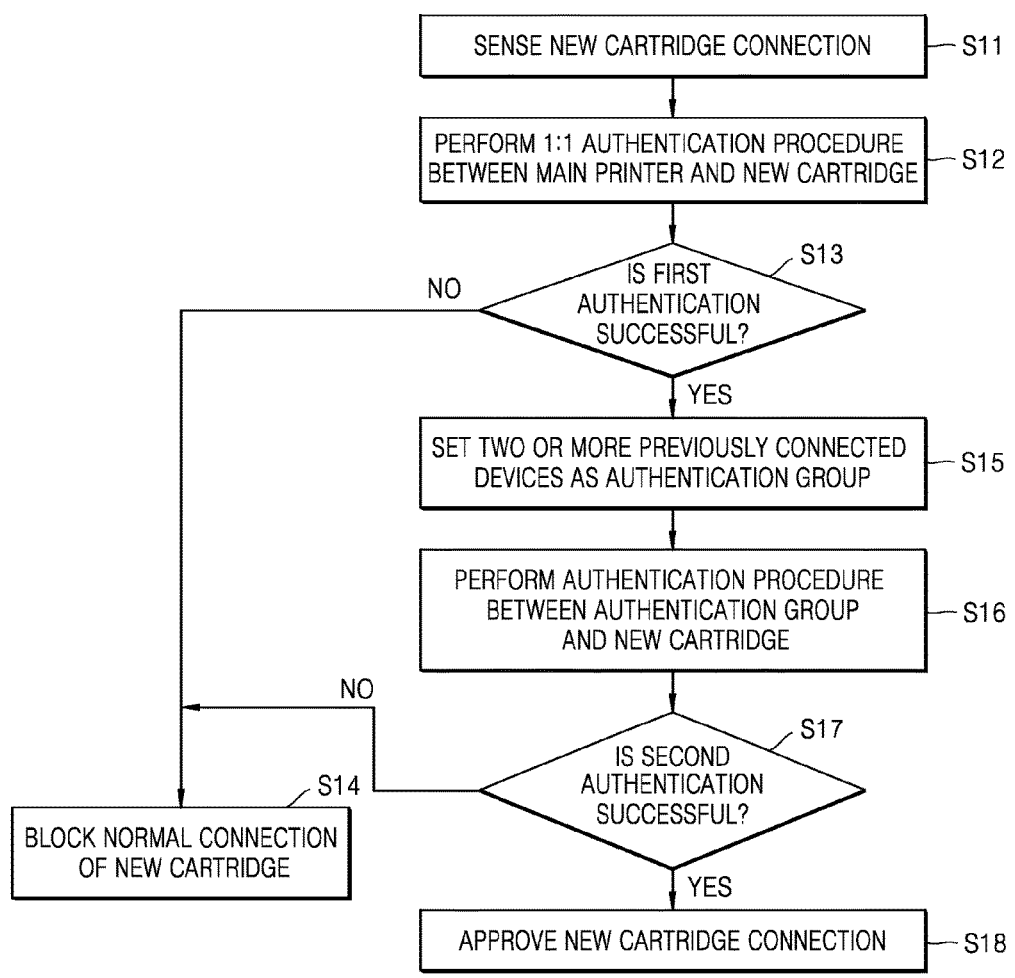
FIG. 4 is a flowchart of an operating method of an image forming system, according to an embodiment.

FIG. 4 is a flowchart of an operating method of an image forming system, according to an embodiment.

Referring to FIG. 4, as a new cartridge is connected to the image forming system (or printer), connection of the new cartridge is sensed (operation S11). Upon sensing the connection of the new cartridge, a one-to-one authentication procedure between the printer and the new cartridge may be performed. For example, a first authentication procedure that is one-to-one challenge-response based may be performed between the printer and the new cartridge (operation S12).

Whether authentication has succeeded is determined according to the first authentication procedure (operation S13). When it is determined that the authentication has failed, normal connection of the new cartridge is blocked (operation S14). On the other hand, when the authentication has succeeded, two or more devices previously connected in the image forming system are set as one authentication group in the image forming system (operation S15). The selection of the authentication group may be independently performed by the main printer, or even by an external networked controller that can communicate with the main printer over a network. Alternatively, the selection of the two or more devices previously connected can be coordinated by the main printer and a set of all devices previously connected, such as based on, for example, which devices were most recently connected, operability or availability of the previously connected devices, and so on. That is, the main printer or an external networked controller can coordinate and instruction previously connected devices to operate as an authentication group at 5515.

A group authentication procedure may be performed between the set authentication group and the new cartridge. For example, a one-to-group challenge-response based authentication procedure may be performed therebetween (operation S16). According to an embodiment, a challenge-response based authentication procedure may be performed between the new cartridge and each of the devices included in the authentication group. Alternatively, an authentication entity may be selected regarding the authentication group. The selected authentication entity may perform an authentication procedure with the new cartridge by using unique information corresponding to the authentication group.

Whether a second authentication procedure that is group-based as described above has succeeded is determined (operation S17). When it is determined that authentication has failed, normal connection of the new cartridge is blocked (operation S14). On the other hand, when the authentication procedure has succeeded, it is determined that an authentication procedure regarding the new cartridge has finally succeeded. Accordingly, connection of the new cartridge to the printer is normally approved (operation S18).

Figure 5:
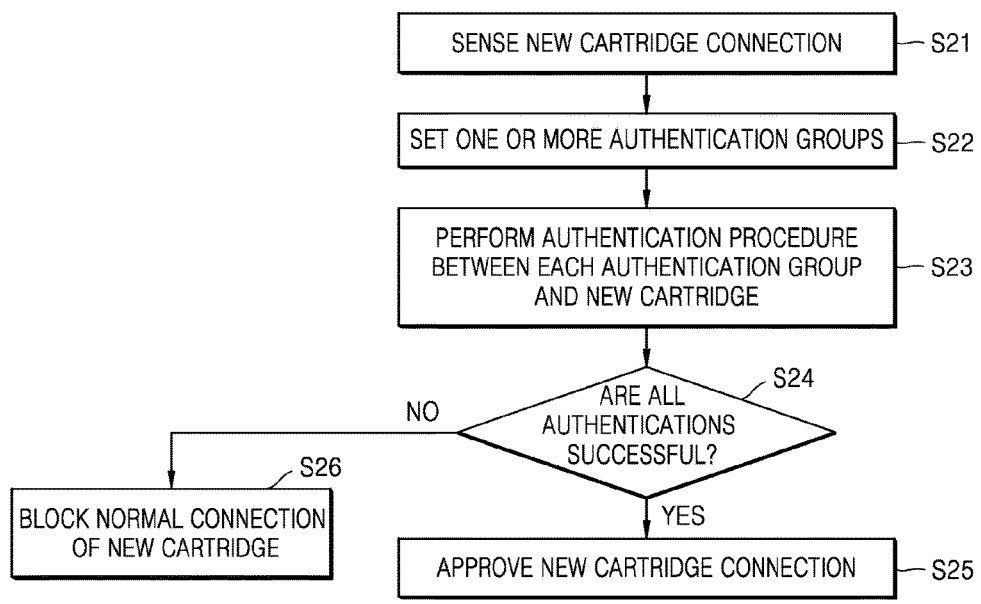
FIG. 5 is a flowchart of an operating method of an image forming system, according to a modifiable embodiment.

FIG. 5 is a flowchart of an operating method of an image forming system, according to a modifiable embodiment. FIG. 5 illustrates an example of performing an authentication procedure regarding a new cartridge only through group authentication without a one-to-one challenge-response based authentication procedure between the new cartridge and a printer.

Referring to FIG. 5, as the new cartridge is connected to the image forming system (or printer), connection of the new cartridge is sensed (operation S21). Upon sensing the connection of the new cartridge, one or more authentication groups are set regarding two or more devices previously connected in the image forming system (operation S22). For example, two or more authentication groups for performing a group authentication procedure with the new cartridge may be set. As an example, some of the devices previously connected in the image forming system may be set as a first authentication group, and some others may be set as a second authentication group. One or more embodiments may be variously modified in other ways. For example, three or more authentication groups may be set.

A group authentication procedure is performed between each of the set one or more authentication groups and the new cartridge (operation S23). When the group authentication procedure is performed multiple times, whether the group authentication procedure all have succeeded is determined (operation S24). When it is determined that at least one authentication procedure has failed, normal connection of the new cartridge is blocked (operation S26). On the other hand, when the group authentication procedure all have succeeded, it is determined that the authentication procedure regarding the new cartridge has finally succeeded. Accordingly, connection of the new cartridge to the printer is normally approved (operation S25).

Figure 6:
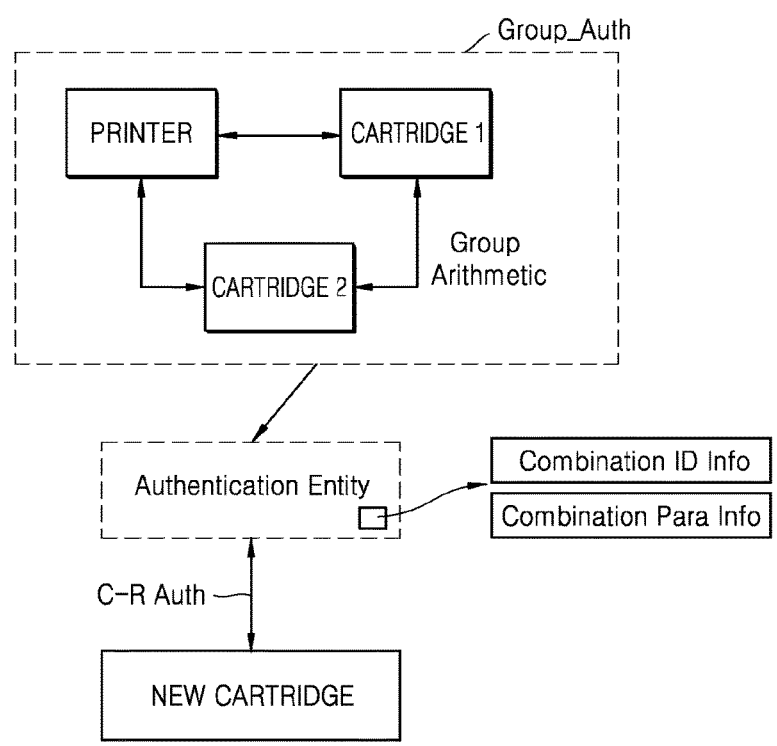
FIG. 6 is a block diagram showing an example in which an authentication entity corresponding to an authentication group performs an authentication procedure.

FIG. 6 is a block diagram of an example in which an authentication entity corresponding to an authentication group performs an authentication procedure.

Referring to FIG. 6, an authentication group Group_Auth that includes one or more devices may be set. For example, the authentication group Group_Auth may include a printer and first and second cartridges. The authentication entity may be selected corresponding to the authentication group Group_Auth. Based on a group operation in the authentication group Group_Auth, information that is used in a group authentication procedure (for example, combination ID information or combination parameter information) may be generated.

In manufacturing processes of the printer and the cartridges, unique information that is used in the group authentication procedure may be installed therein. For example, a new cartridge may perform authentication regarding the authentication group Group_Auth through an operation using unique information stored in an internal security IC of the new cartridge and combination information from the authentication group Group_Auth. Also, unique information from the new cartridge may be provided to the authentication group Group_Auth. The authentication group Group_Auth may perform authentication regarding the new cartridge through an operation using the unique information from the new cartridge and combination information generated in the authentication group Group_Auth.

FIGS. 7A to 10C each are a block diagram of an example of setting an authentication group according to various methods and an example of performing a group authentication procedure based on the authentication group. Also, FIGS. 7A to 10C each illustrate an image forming system, which is a device system, including a printer and multiple cartridges.

Figure 7A:
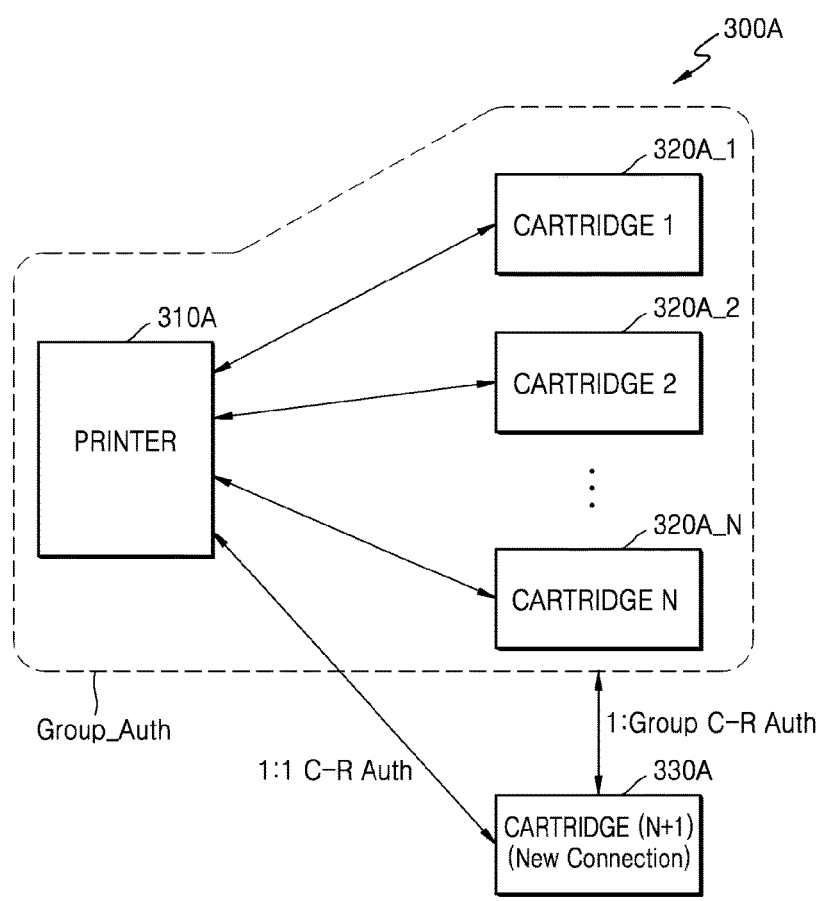
FIGS. 7A to 10C each are a block diagram showing an example of setting an authentication group according to various methods and an example of performing a group authentication procedure based on the authentication group.

Referring to FIG. 7A, an image forming system 300A may include a printer 310A as an image forming apparatus and may also include first to N-th cartridges 320A_1 to 320A_N as devices capable of being connected to the printer 310A. A (N+1)$^{th}$ cartridge 330A may be further connected to the printer 310A later as an additional cartridge.

In FIG. 7A, an example of setting the printer 310A and the first to N-th cartridges 320A_1 to 320A_N, which are all devices previously connected in the image forming system 300A, as one authentication group Group_Auth is shown. According to an embodiment, a first authentication procedure that is one-to-one challenge-response based may be performed first between the newly connected (N+1)$^{th}$ cartridge 330A and the printer 310A. When the first authentication procedure succeeds, a second authentication procedure that is group based may be performed between the authentication group Group_Auth and the (N+1)$^{th}$ cartridge 330A. According to an embodiment, an authentication procedure may be performed between each of the devices included in the authentication group Group_Auth and the (N+1)$^{th}$ cartridge 330A or between an authentication entity corresponding to the authentication group Group_Auth and the (N+1)th cartridge 330A. When the second authentication procedure succeeds, normal connection regarding the (N+1)$^{th}$ cartridge 330A may be allowed.

Figure 7B:
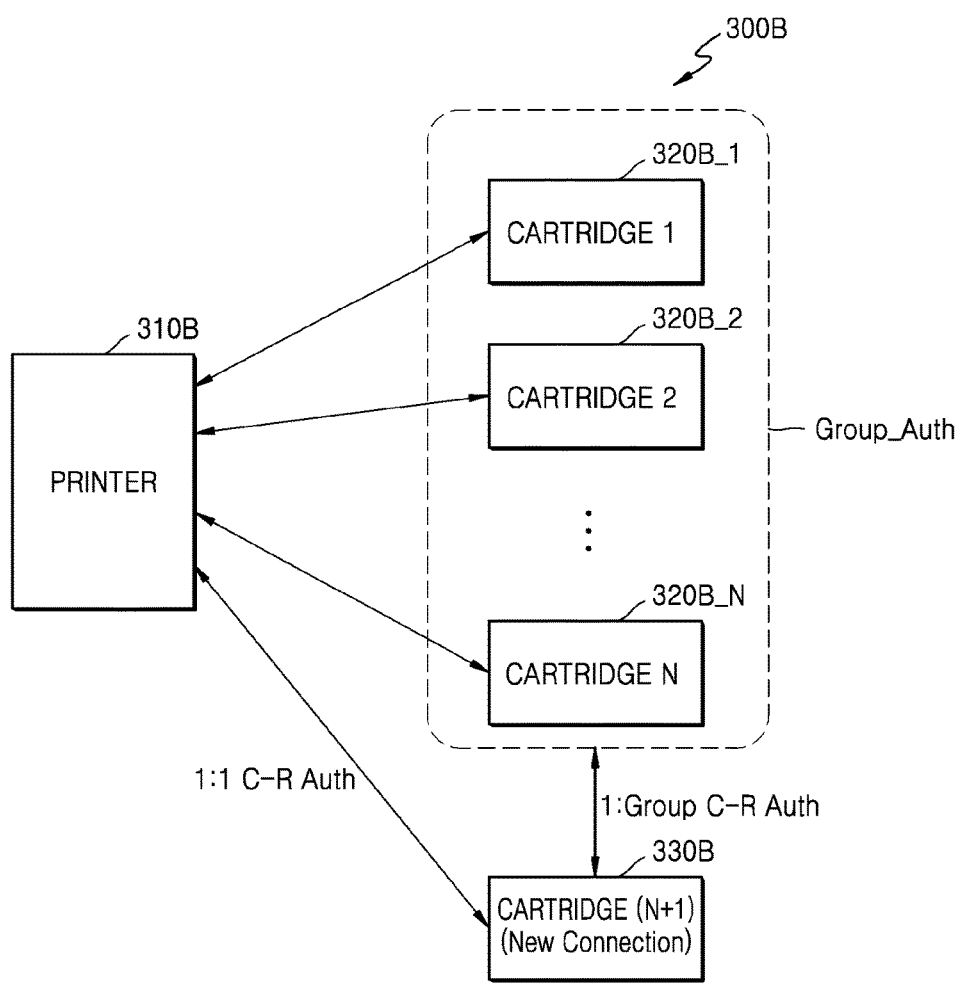

Referring to FIG. 7B, an image forming system 300B may include a printer 310B as an image forming apparatus and first to N-th cartridges 320B_1 to 320B_N as devices capable of being connected to the printer 310B. A (N+1)$^{th}$ cartridge 330B may be further connected to the printer 310B later as an additional cartridge.

In FIG. 7B, an example of setting devices except a main printer as one authentication group Group_Auth in the image forming system 300B is shown. For example, a first authentication procedure that is one-to-one challenge-response based may be performed between the newly connected (N+1)$^{th}$ cartridge 330B and the printer 310B. A second authentication procedure that is group based may be performed thereafter between the (N+1)$^{th}$ cartridge 330B and the authentication group Group_Auth. As an example of setting the authentication group Group_Auth, the authentication group Group_Auth may be set excluding the printer 310B. For example, the first to N-th cartridges 320B_1 to 320B_N may be the authentication group Group_Auth. According to an embodiment, a one-to-group challenge-response based authentication procedure may be performed between an authentication entity corresponding to the authentication group Group_Auth and the (N+1)$^{th}$ cartridge 330B.

Figure 8A:
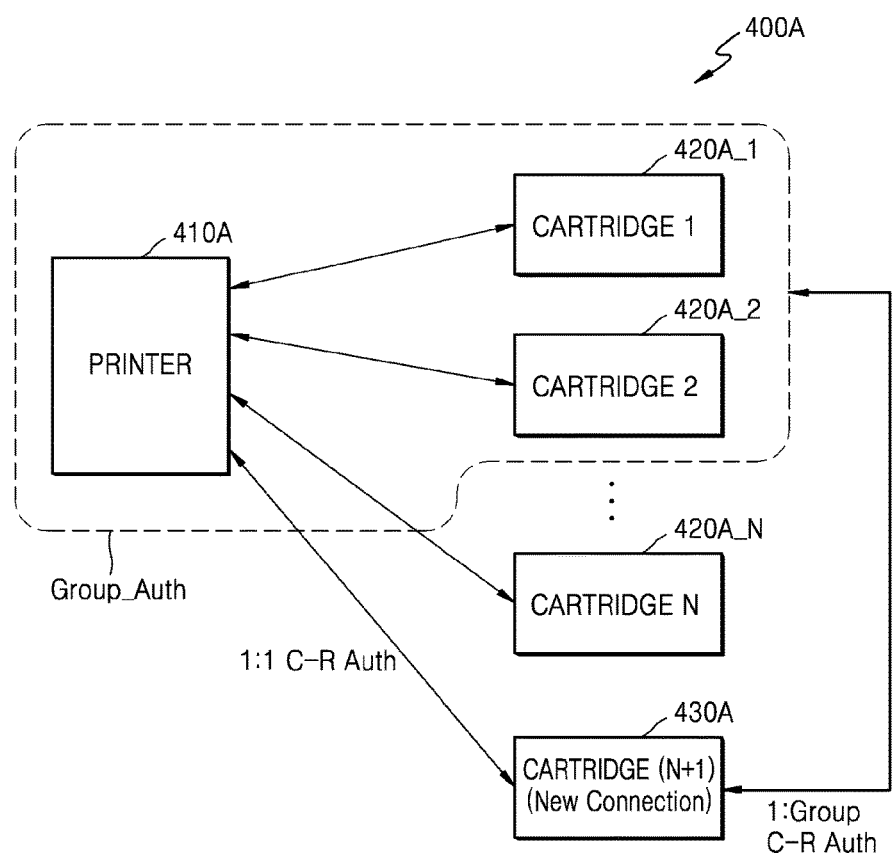

FIG. 8A illustrates an example of setting, from among devices included in an image forming system 400A, only some of the devices as an authentication group Group_Auth.

Referring to FIG. 8A, the image forming system 400A may include a printer 410A as an image forming apparatus and may also include first to N-th cartridges 420A_1 to 420A_N normally connected to the printer 410A. A (N+1)$^{th}$ cartridge 430A may be further connected to the printer 410A later as an additional cartridge.

A first authentication procedure that is one-to-one challenge-response based may be performed between the newly connected (N+1)$^{th}$ cartridge 430A and the printer 410A. A second authentication procedure that is group based may be performed between the authentication group Group_Auth that includes some devices and the newly connected (N+1)$^{th}$ cartridge 430A. As an example of the authentication group Group_Auth, the printer 410A and the first and second cartridges 420A_1 and 420A_2 may be set as the authentication group Group_Auth. However, this is just one embodiment, and the authentication group Group_Auth may be variously set within the image forming system 400A. For example, certain devices may be set as the authentication group Group_Auth, or various numbers of devices may be arbitrarily set as the authentication group Group_Auth.

Figure 8B:
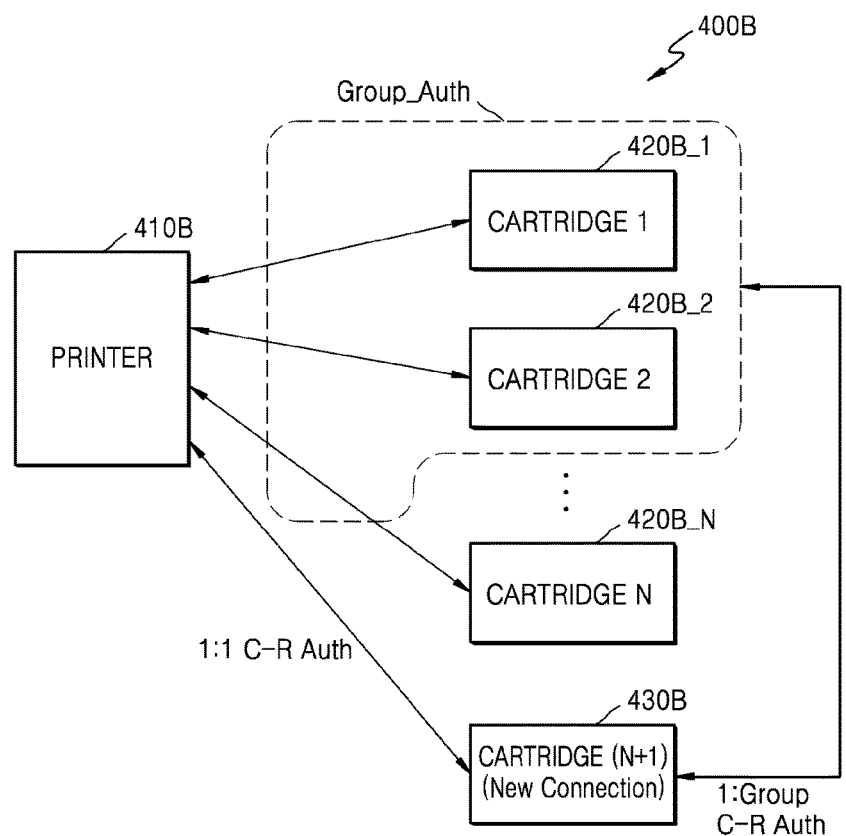

Referring to FIG. 8B, an authentication group Group_Auth that is to perform group authentication in an image forming system 400B may be set according to various methods. For example, the authentication group Group_Auth may only include cartridges excluding a printer 410B.

For example, as a (N+1)$^{th}$ cartridge 430B is connected to the printer 410B as a new cartridge, some of first to N-th cartridges 420B_1 to 420B_N previously connected to the printer 410B may be set as the authentication group Group_Auth. For example, as the first and second cartridges 420B_1 and 420B_2 are set as the authentication group Group_Auth, a group authentication procedure may be performed between an authentication entity corresponding to the authentication group Group_Auth and the (N+1)$^{th}$ cartridge 430B. Also, according to the above-described embodiment, a one-to-one challenge-response based authentication procedure between the (N+1)$^{th}$ cartridge 430B and the printer 410B and a group operation in the authentication group Group_Auth may be further performed.

Figure 9:
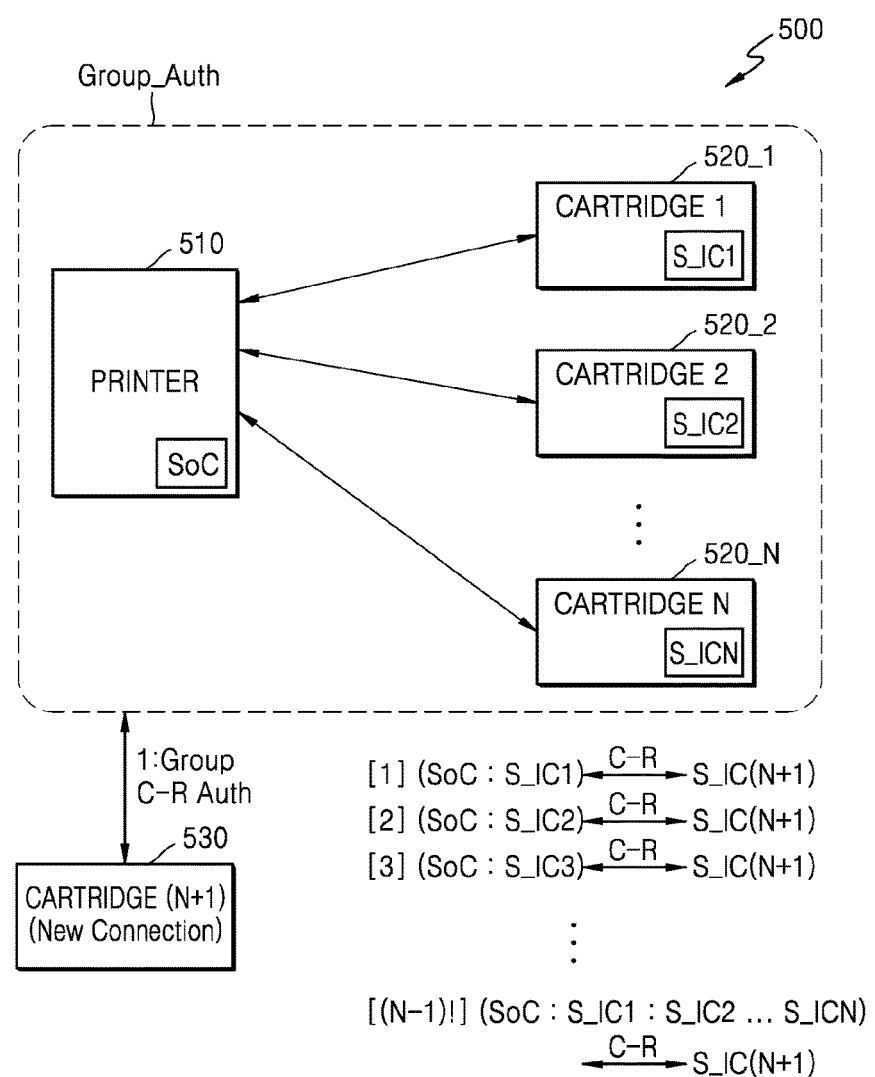

FIG. 9 is a block diagram of types of an authentication group Group_Auth that may be set.

Referring to FIG. 9, an image forming system 500 may include a printer and multiple cartridges that are previously connected to each other. For example, the image forming system 500 may include a printer 510 and first to N-th cartridges 520_1 to 520_N. Also, as a (N+1)$^{th}$ cartridge 530 is newly connected, a group authentication procedure may be performed between the (N+1)$^{th}$ cartridge 530 and the authentication group Group_Auth. Also, for example, FIG. 9 illustrates an example of including the printer 510 in the authentication group Group_Auth when setting the authentication group Group_Auth. The printer 510 may include a system-on-chip for performing an authentication procedure. Each of the first to $(N+1)^{th}$ cartridges 520_1 to 520_N and 530 may include a security IC for performing an authentication procedure.

As in the above-described embodiment, in the image forming system 500, the authentication group Group_Auth may be set as various numbers of devices are arbitrarily selected. For example, when N cartridges are previously included in the image forming system 500, from a minimum of one cartridge to a maximum of N cartridges may be included in the authentication group Group_Auth. When it is assumed that there are N cartridges previously included, the number of possible combinations of the authentication group Group_Auth may have a value of (N−1)!.

According to an embodiment, a group authentication procedure may be performed via one or more authentication groups Group_Auth selected from the (N−1)! possible combinations of the authentication group Group_Auth. That is, when group authentication procedures are performed multiple times with respect to one device, the group authentication procedures may be performed via at least two authentication groups Group_Auth from among the possible combinations of the authentication group Group_Auth.

For example, the printer 510 and the first cartridge 520_1 may be set as an authentication group Group_Auth according to a first combination. An authentication procedure (for example, a challenge-response based authentication procedure) may be performed between the $(N+1)^{th}$ cartridge 530 and the authentication group Group_Auth according to the first combination. Afterwards, the printer 510 and some cartridges may be set as an authentication group Group_Auth according to a second combination. An authentication procedure may be performed between the $(N+1)^{th}$ cartridge 530 and the authentication group Group_Auth according to the second combination.

Figure 10A:
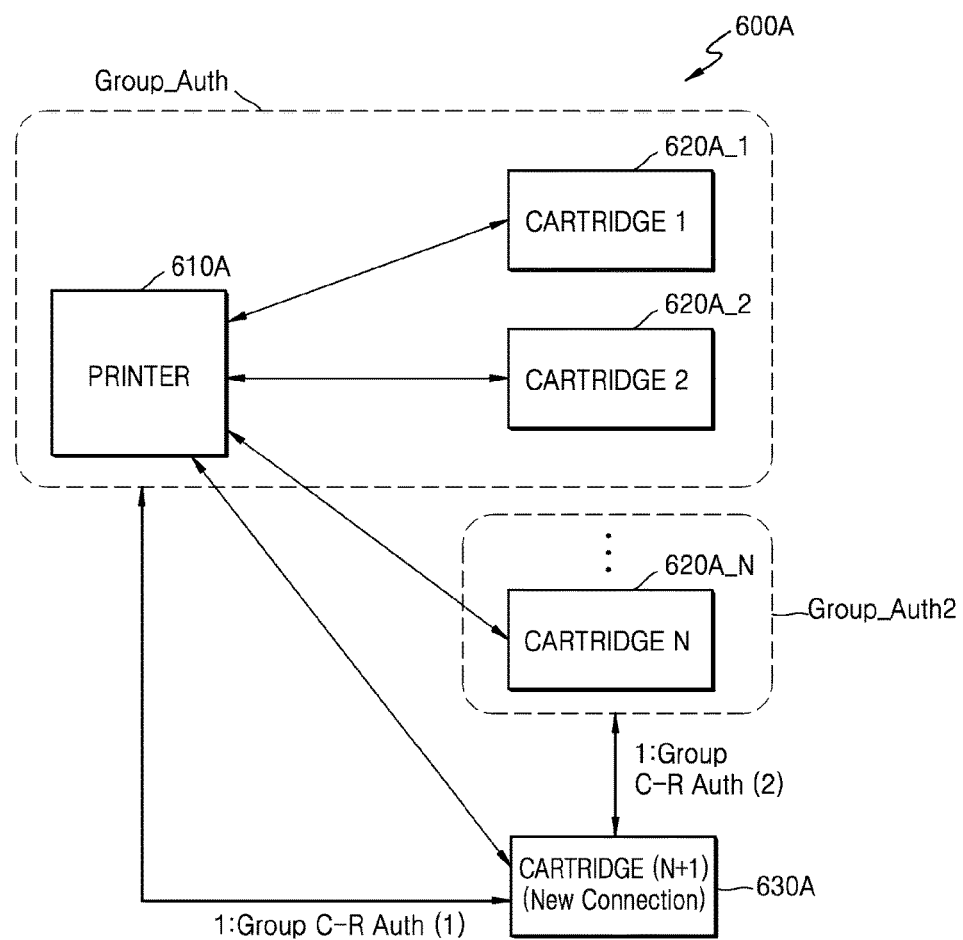
Figure 10B:
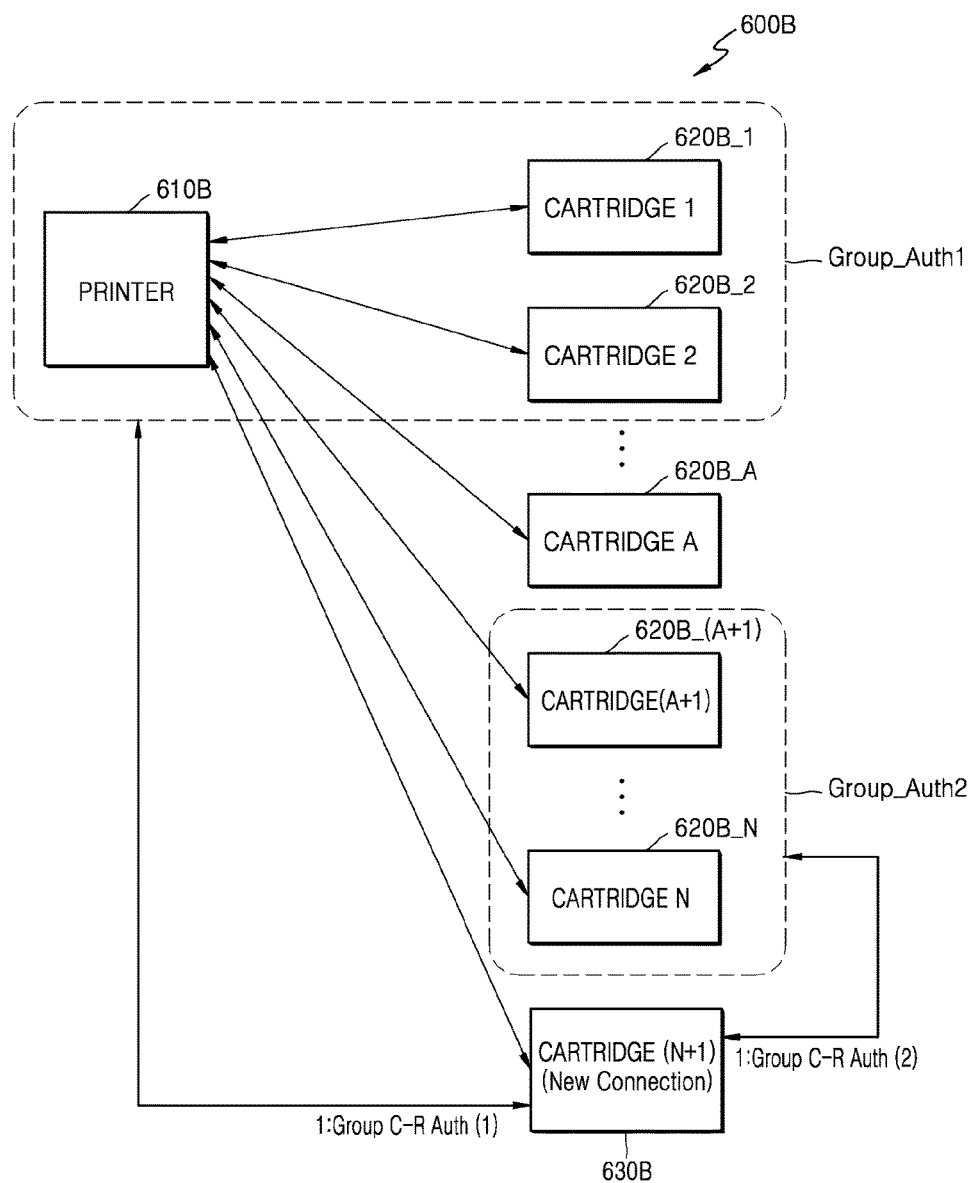
Figure 10C:
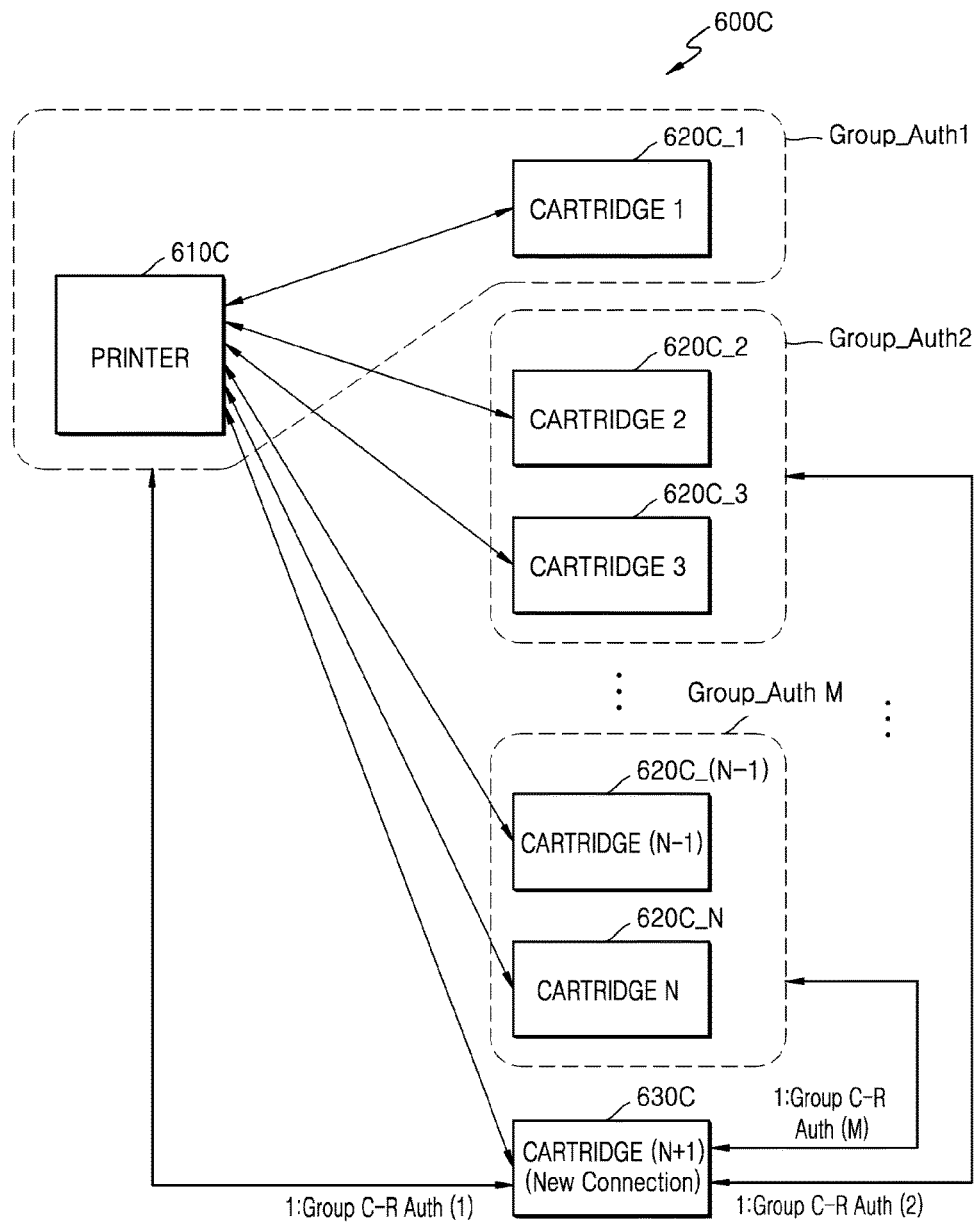

FIGS. 10A to 10C each illustrate an example of setting multiple authentication groups Group_Auth in an image forming system.

Referring to FIG. 10A, an image forming system 600A may include a printer 610A as an image forming apparatus and may also include first to N-th cartridges 620A_1 to 620A_N as devices capable of being connected to the printer 610A. Next, an example of further connecting a $(N+1)^{th}$ cartridge 630A to the printer 610A as an additional cartridge is shown.

For example, regarding devices previously connected to the image forming system 600A, the printer 610A and some cartridges (for example, the first and second cartridges 620A_1 and 620A_2) may be set as a first authentication group Group_Auth1. The other cartridges (for example, the third to N-th cartridges 620A_3 to 620A_N) may be set as a second authentication group Group_Auth2. As the authentication groups Group_Auth are set as described above, when the $(N+1)^{th}$ cartridge 630A is newly connected, a group challenge-response based authentication procedure may be performed between the $(N+1)^{th}$ cartridge 630A and the first authentication group Group_Auth1. Also, a group challenge-response based authentication procedure may be performed between the $(N+1)^{th}$ cartridge 630A and the second authentication group Group_Auth2.

FIG. 10B illustrates an example of setting, from among devices previously connected to an image forming system 600B, only some of the devices as an authentication group and setting two or more authentication groups Group_Auth on the image forming system 600B.

Referring to FIG. 10B, some of the devices previously connected to the image forming system 600B may be set as two authentication groups Group_Auth. For example, a printer 610B and some cartridges (for example, first and second cartridges 620B_1 and 620B_2) may be set as a first authentication group Group_Auth1. Some other cartridges (for example, $(A+1)^{th}$ to N-th cartridges 620B (A+1) to 620B_N) may be set as a second authentication group Group_Auth2. In a similar way to the above description, when a $(N+1)^{th}$ cartridge 630B is newly connected, a group challenge-response based authentication procedure may be performed between the $(N+1)^{th}$ cartridge 630B and the first authentication group Group_Auth1. Also, a group challenge-response based authentication procedure may be performed between the $(N+1)^{th}$ cartridge 630B and the second authentication group Group_Auth2.

FIG. 10C illustrates an example of setting multiple authentication groups Group_Auth on an image forming system 600C.

Referring to FIG. 10C, devices previously connected to the image forming system 600C may be set as M authentication groups Group_Auth1 to Group_AuthM. Alternatively, some of the devices previously connected to the image forming system 600C may be set as M authentication groups Group_Auth1 to Group_AuthM. In a similar way to the above description, when a $(N+1)^{th}$ cartridge 630C is newly connected, a group challenge-response based authentication procedure may be performed between each of the M authentication groups Group_Auth1 to Group_AuthM and the newly connected $(N+1)^{th}$ cartridge 630C.

Figure 11:
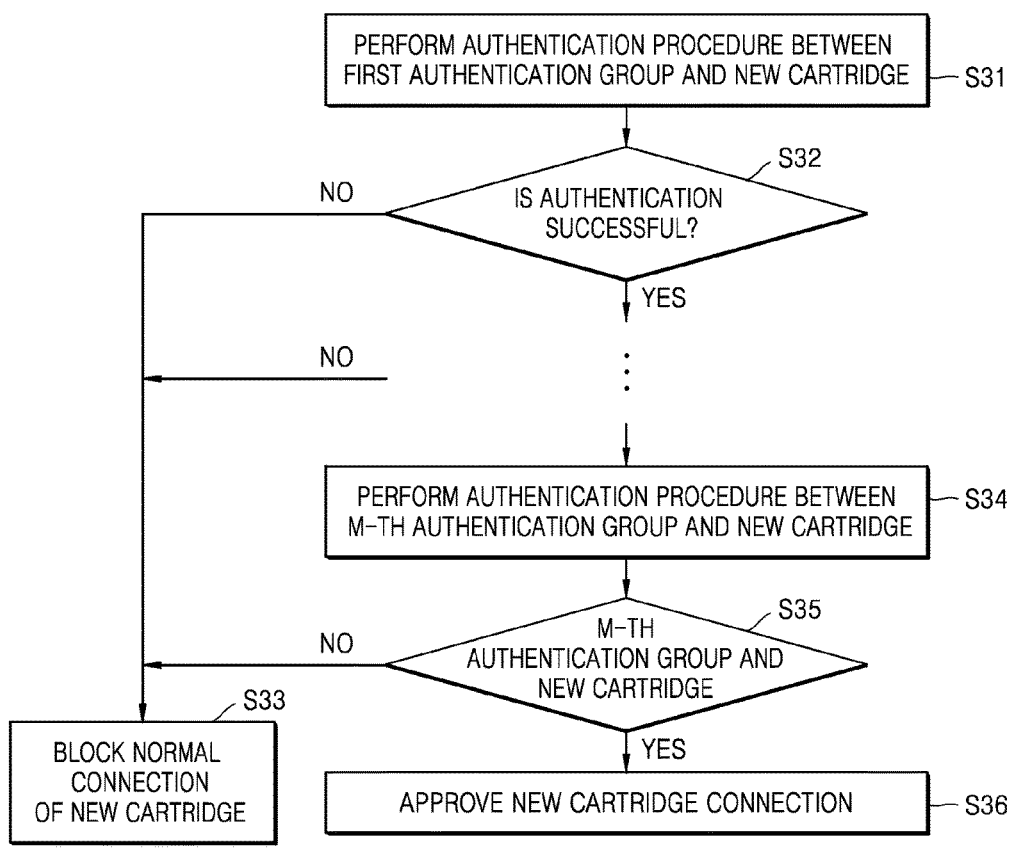
FIG. 11 is a flowchart of an operating method of an image forming system including multiple authentication groups.

FIG. 11 is a flowchart of an operating method of an image forming system that includes multiple authentication groups.

As in the above-described embodiment, multiple authentication groups may be set in an image forming system. For example, some devices may be set as an authentication group, and some other devices may be set as another authentication group. Alternatively, as in the above-described embodiment, there may be various combinations of authentication groups according to the number of devices, and a group authentication procedure may be performed according to two or more combinations of authentication groups from among those combinations.

Referring to FIG. 11, as a new cartridge is connected to the image forming system (or printer), a group authentication procedure is performed regarding the new cartridge. For example, multiple authentication groups may be set according to devices previously connected to the image forming system. An authentication procedure may be performed between the new cartridge and a first authentication group (operation S31).

Whether group authentication has succeeded is determined (operation S32), and when it is determined that the authentication has failed, normal connection of the new cartridge is blocked (operation S33). On the other hand, when it is determined that the authentication has succeeded, an operation of performing a mutual authentication procedure that is group based between the new cartridge and another authentication group and an operation of determining whether the authentication has succeeded are repeated. As a final authentication group, a mutual authentication procedure that is group based is performed between a M-th authentication group and the new cartridge (operation S34). Whether authentication by the M-th authentication group has succeeded is determined (operation S35). When the authentication by the M-th authentication group has succeeded, it is determined that an authentication procedure regarding the new cartridge has finally succeeded. Accordingly, connection of the new cartridge is normally approved (operation S36).

Figure 12A:
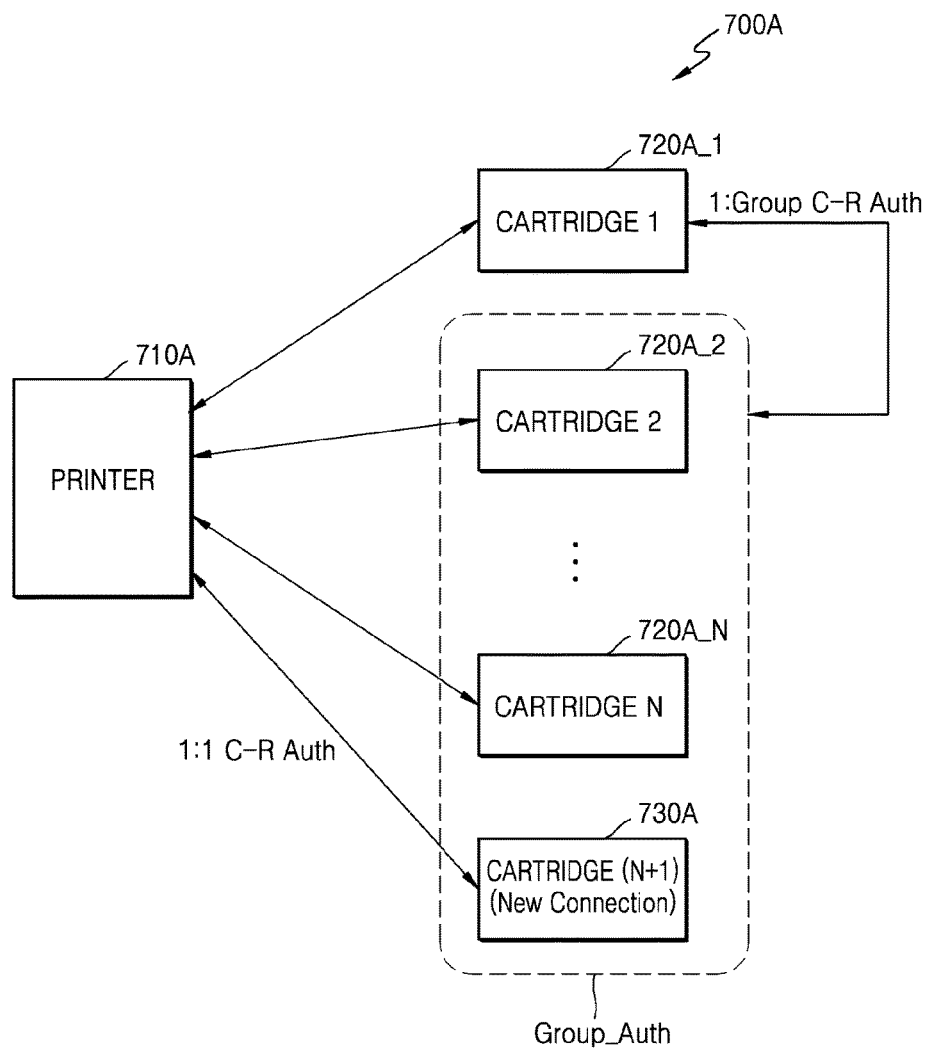
FIGS. 12A and 12B each are a block diagram showing an example of setting an authentication group according to a modifiable embodiment.
Figure 12B:
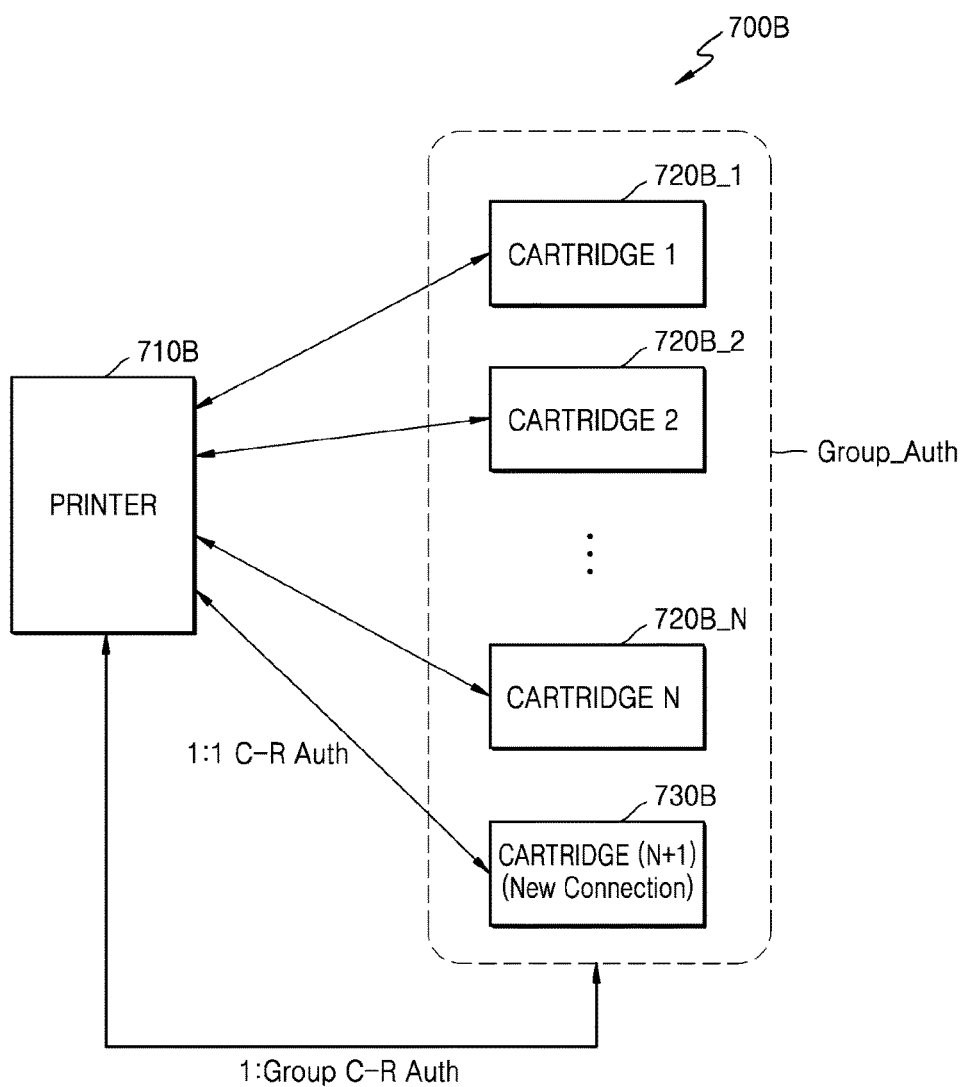

FIGS. 12A and 12B each are a block diagram showing an example of setting an authentication group according to a modifiable embodiment. FIGS. 12A and 12B illustrate an example of including a newly connected device in the authentication group.

Referring to FIG. 12A, an image forming system 700A may have a printer 710A and first to N-th cartridges 720A_1 to 720A_N previously connected to each other. A $(N+1)^{th}$ cartridge 730A may be further connected to the printer 710A as an additional cartridge. According to an embodiment, a one-to-one challenge-response based authentication procedure may be performed first between the printer 710A and the $(N+1)^{th}$ cartridge 730A.

Also, according to one or more embodiments, the newly connected $(N+1)^{th}$ cartridge 730A may be included in an authentication group Group_Auth. A group authentication procedure may be performed between one cartridge and the authentication group Group_Auth in the image forming system 700A. Although FIG. 12A illustrates an example of setting all the other cartridges 720A_2 to 720A_N and 730A except the first cartridge 720A_1 as one authentication group Group_Auth, one or more embodiments are not limited thereto. As an modifiable embodiment, the authentication group Group_Auth may include some of the other cartridges as well as the $(N+1)^{th}$ cartridge 730A.

A group authentication procedure may be performed between the first cartridge 720A_1 and the authentication group Group_Auth. The group authentication procedure may be performed in various methods according to the above-described embodiments. In this regard, although the $(N+1)^{th}$ cartridge 730A is an unauthorized cartridge, it may be determined by another genuine cartridge normally performing a security function that the group authentication procedure has failed.

FIG. 12B illustrates an example of including a newly connected $(N+1)^{th}$ cartridge 730B in an authentication group Group_Auth and performing a group authentication procedure between a printer 710B and the authentication group Group_Auth. According to an embodiment, a one-to-one challenge-response based authentication procedure may be performed first between the printer 710B and the $(N+1)^{th}$ cartridge 730B.

The authentication group Group_Auth may be set to include existing cartridges 720B_1 to 720B_N and the new $(N+1)^{th}$ cartridge 730B. In this regard, although the printer 710B fails to normally perform a security function, and the $(N+1)^{th}$ cartridge 730B is an unauthorized cartridge, it may be determined by another genuine cartridge normally performing the security function that the group authentication procedure has failed.

Figure 13:
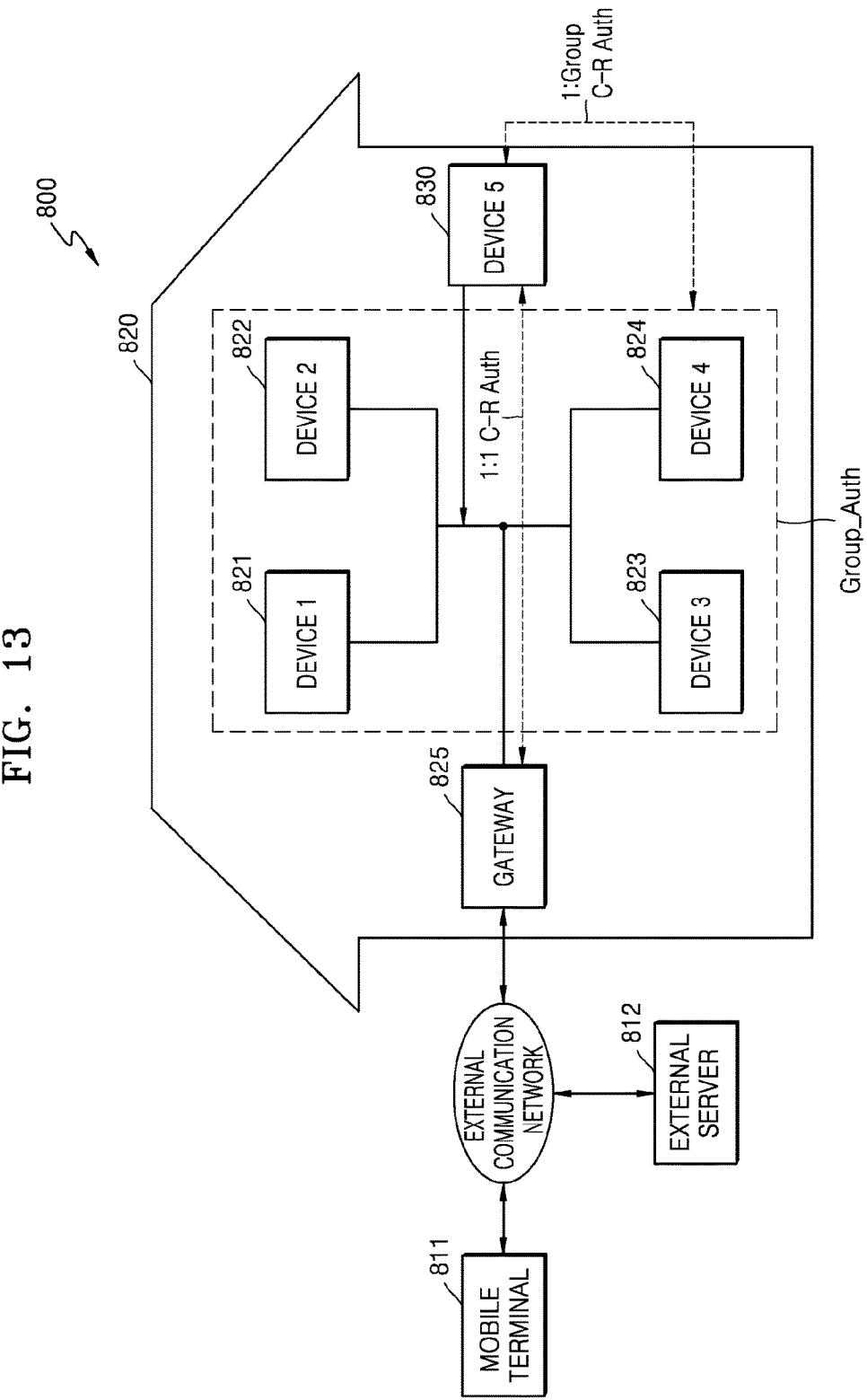
FIG. 13 is a block diagram of an Internet of Things system that includes a device according to an embodiment.

FIG. 13 is a block diagram of an Internet of Things system that includes a device according to an embodiment. FIG. 13 illustrates an example of a smart home system as the Internet of Things system and an example in which a device according to embodiments corresponds to a device of the smart home system.

Referring to FIG. 13, multiple devices 821 to 824 included in a smart home system 800 may access an external terminal 811 or an external server 812 via a gateway 825 and an external communication network. The devices 821 to 824 may be household appliances, such as a refrigerator, an air conditioner, a washing machine, and a cleaner, used in smart home, and information such as status or malfunction diagnosis of the devices 821 to 824 may be provided to the external server 812. The external server 812 receives information regarding the devices 821 to 824 and provides smart management service regarding them.

Also, a user of the mobile terminal 811 may access the devices 821 to 824 via the external communication network and the gateway 825. Also, the user of the mobile terminal 811 may access the external server 812 via the external communication network and determine status of the devices 821 to 824.

A new device (for example, a fifth device 830) may be newly connected to the smart home system 800 that may be configured as described above. In this case, a group authentication procedure according to the above-described embodiments may be performed regarding the newly connected fifth device 830. For example, a one-to-one challenge-response based authentication procedure may be performed between an authentication module included in the gate way 825 and the fifth device 830. As an authentication group Group_Auth that includes devices previously connected to the smart home system 800 is set, a group authentication procedure may be performed between the authentication group Group_Auth and the fifth device 830. FIG. 13 illustrates an example of setting the first to fourth devices 821 to 824 as one authentication group Group_Auth.

According to the authentication procedure as described above, security regarding existing devices included in the smart home system 800 may be enhanced. Devices that are not genuine may be prevented from working as configurations of the smart home system 800.

While the concepts described herein have been particularly shown and described with reference to embodiments thereof, it will be understood that various changes in form and details may be made therein without departing from the spirit and scope of the following claims.

What is claimed is:

1. An operating method of a device system comprising a plurality of devices including a main device and at least one sub-device, the method comprising:
    performing a first authentication procedure with respect to a first device that is to be newly connected to the device system and which is not yet connected to the device system;
    performing a second authentication procedure, separate from the first authentication procedure, with respect to the first device via and by using an authentication group comprising at least two devices selected from the plurality of devices and including at least one sub-device that has successfully authenticated to the main device, wherein the second authentication procedure is a group-based authentication procedure; and
    when the first authentication procedure and the second authentication procedure are successful, approving connection of the first device to the device system, and when either or both of the first or second authentication procedures is unsuccessful, preventing connection of the first device to the device system,
    wherein N authentication groups are set based on the plurality of devices and N is an integer equal to or greater than 2, and
    wherein the performing of the second authentication procedure comprises performing an authentication procedure between each of the N authentication groups and the first device.

2. The operating method of claim 1,
    wherein the device system comprises a printer system,
    wherein the plurality of devices comprise a printer and one or more cartridges, and wherein the first device comprises a first cartridge that is newly connecting to the printer.

3. The operating method of claim 2,
wherein the first authentication procedure comprises a one-to-one challenge-response based authentication procedure between the printer and the first cartridge.

4. The operating method of claim 2,
wherein the authentication group comprises at least some of the one or more cartridges and the printer.

5. The operating method of claim 2,
wherein the plurality of devices comprise the printer and a plurality of cartridges, and
wherein the authentication group comprises the plurality of cartridges.

6. The operating method of claim 1,
wherein the performing of the second authentication procedure comprises performing an authentication procedure between the first device and an authentication entity selected from the at least two devices in the authentication group.

7. The operating method of claim 1,
wherein a number of possible combinations of authentication groups according to a number of the devices in the authentication group is M combinations and M is an integer equal to or greater than 2, and
wherein the performing of the second authentication procedure comprises performing an authentication procedure between each of the authentication groups according to two or more combinations from among the M combinations and the first device.

8. The operating method of claim 1,
wherein the authentication group also comprises the first device, and
wherein the performing of the second authentication procedure comprises performing an authentication procedure between the authentication group and one selected from the plurality of devices.

9. An operating method of a device, the method comprising:
upon sensing a connection of the device to a main device, requesting a first authentication procedure with respect to the main device;
receiving a request for a second authentication procedure with an authentication group comprising at least one sub-device previously successfully connected to the main device; and
in response to the receiving of the request for the second authentication procedure, performing the second authentication procedure with the authentication group that comprises the at least one sub-device previously successfully connected to the main device,
when the first authentication procedure and the second authentication procedure are successful, approving connection of the device to the main device, and when either or both of the first or second authentication procedures is unsuccessful, preventing connection of the device to the main device,
wherein the device comprises a cartridge that is newly connecting to a printer in a printer system, the main device comprises the printer in the printer system, and the printer system includes the printer and one or more cartridges including the device, and
wherein the first authentication procedure comprises a one-to-one challenge-response based authentication procedure between the printer and the cartridge.

10. The operating method of claim 9, further comprising:
according to the requesting of the first authentication procedure with respect to the main device, performing a one-to-one challenge-response based authentication procedure with the main device.

11. The operating method of claim 9,
wherein the performing of the second authentication procedure with the authentication group comprises performing a group challenge-response based authentication procedure with the authentication group comprising the main device and the at least one sub-device previously successfully connected to the main device.

12. The operating method of claim 9,
wherein the at least one sub-device comprises at least one cartridge previously successfully connected to the printer.

13. The operating method of claim 12,
wherein the authentication group comprises at least two devices selected from the printer and the at least one cartridge, and
wherein the performing of the second authentication procedure with the authentication group comprises performing a challenge-response based authentication procedure with respect to each of the devices in the authentication group.

14. The operating method of claim 12,
wherein the authentication group comprises at least two devices selected from the printer and the at least one cartridge previously successfully connected to the printer, and
wherein the performing of the second authentication procedure with the authentication group comprises performing a challenge-response based authentication procedure with an authentication entity selected from the devices in the authentication group.

15. A method of connecting a new device to a device system comprising a plurality of existing devices including a main device and at least one sub-device, the method comprising:
performing a first authentication procedure between the main device of the device system and the new device that is to be newly connected to the device system and that is not yet connected to the device system;
coordinating a second authentication procedure, separate from the first authentication procedure, between the new device and an authentication group comprising selections of at least two of the plurality of existing devices, wherein the second authentication procedure is a group-based authentication procedure performed by at least one sub-device that has successfully authenticated to the main device; and
when the first authentication procedure and the second authentication procedure are successful, approving connection of the new device to the device system, and when either or both of the first or second authentication procedures is unsuccessful, preventing connection of the new device to the device system,
wherein the new device comprises a cartridge that is newly connecting to a printer in a printer system, the main device comprises the printer in the printer system, and the printer system includes the printer and one or more cartridges including the new device, and
wherein the first authentication procedure comprises a one-to-one challenge-response based authentication procedure between the printer and the cartridge.

16. The method of claim 15,
wherein at least one of the plurality of existing devices comprises a cartridge.

17. The method of claim 16,
wherein the second authentication procedure comprises an authentication procedure between each of the authentication group and the new device.

18. The method of claim 16,
wherein the second authentication procedure comprises an authentication procedure between an authentication entity selected from the devices in the authentication group and the new device.

19. The method of claim 15, further comprising:
sensing an attempt to connect the new device to the device system, and requesting an authentication procedure based on the sensing in order to allow connection of the new device to the device system.

\* \* \* \* \*